(12) United States Patent
Humphrey et al.

(10) Patent No.: US 10,305,716 B2
(45) Date of Patent: May 28, 2019

(54) METHOD AND APPARATUS FOR TRANSMITTING AND RECEIVING SIGNALS OVER TWO PAIRS OF WIRES

(71) Applicant: BRITISH TELECOMMUNICATIONS PUBLIC LIMITED COMPANY, London (GB)

(72) Inventors: Leslie Humphrey, London (GB); Anas Al Rawi, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 0 days.

(21) Appl. No.: 15/562,165

(22) PCT Filed: Mar. 30, 2016

(86) PCT No.: PCT/EP2016/056976
§ 371 (c)(1),
(2) Date: Sep. 27, 2017

(87) PCT Pub. No.: WO2016/156441
PCT Pub. Date: Oct. 6, 2016

(65) Prior Publication Data
US 2018/0083815 A1    Mar. 22, 2018

(30) Foreign Application Priority Data
Mar. 31, 2015 (EP) .................. 15162109

(51) Int. Cl.
*H04B 3/32* (2006.01)
*H04L 25/02* (2006.01)
(Continued)

(52) U.S. Cl.
CPC ............. *H04L 27/265* (2013.01); *H04B 3/32* (2013.01); *H04L 25/0272* (2013.01);
(Continued)

(58) Field of Classification Search
CPC . H04B 1/38; H04B 1/40; H04B 1/401; H04B 1/50; H04B 1/54; H04B 1/56;
(Continued)

(56) References Cited

U.S. PATENT DOCUMENTS

| | | | |
|---|---|---|---|
| 2001/0016021 A1* | 8/2001 | Chan | H04B 1/586 375/346 |
| 2005/0018784 A1* | 1/2005 | Kurobe | H04L 1/0003 375/260 |

(Continued)

FOREIGN PATENT DOCUMENTS

| | | |
|---|---|---|
| EP | 2 091 196 | 8/2009 |
| EP | 1 733 550 | 8/2011 |

(Continued)

OTHER PUBLICATIONS

International Search Report for PCT/EP2016/056976, dated Jun. 2, 2016, 2 pages.
Written Opinion of the ISA for PCT/EP2016/056976, dated Jun. 2, 2016, 7 pages.
(Continued)

*Primary Examiner* — Young T Tse
(74) *Attorney, Agent, or Firm* — Nixon & Vanderhye PC

(57) ABSTRACT

In a method of transmitting data between a transmitter and a receiver via two pairs of wires in a differential mode, the method comprises transmitting, from the transmitter to the receiver, related signals onto the two pairs of wires in respect of each tone in a first subset of tones and processing the received signals in dependence upon estimated channel transfer functions associated with both direct and crosstalk channels. The method further comprises transmitting, from the transmitter to the receiver, unrelated signals onto the two pairs of wires for each tone in a second subset of the tones, the unrelated signals being vector precoded before transmission and wherein a cut-off frequency and/or tone demarcates between the first and the second subsets of tones.

8 Claims, 3 Drawing Sheets

(51) Int. Cl.
  *H04L 27/01*     (2006.01)
  *H04L 27/26*     (2006.01)
  *H04L 27/34*     (2006.01)
(52) U.S. Cl.
  CPC .......... *H04L 27/01* (2013.01); *H04L 27/2647*
          (2013.01); *H04L 27/34* (2013.01)
(58) Field of Classification Search
  CPC ............... H04L 25/026; H04L 25/0264; H04L
          25/0272; H04L 27/0002; H04L 27/01;
          H04L 27/02; H04L 27/265; H04L 27/34
  USPC ....... 375/219, 220, 222, 257, 260–262, 284,
          375/285; 455/39, 500, 501, 67.11, 67.13,
          455/73, 88
  See application file for complete search history.

(56) References Cited

U.S. PATENT DOCUMENTS

2009/0253451 A1* 10/2009 Trachewsky ............ H04W 4/14
                                                         455/509
2013/0259101 A1* 10/2013 Earnshaw ................ H04B 3/32
                                                         375/219

FOREIGN PATENT DOCUMENTS

WO    WO 2005/004429    1/2005
WO    WO 2013/026479    2/2013

OTHER PUBLICATIONS

Search Report for EP15162109 dated Jun. 10, 2015, 9 pages.

* cited by examiner

METHOD AND APPARATUS FOR TRANSMITTING AND RECEIVING SIGNALS OVER TWO PAIRS OF WIRES

FIELD

The present invention relates to a method and apparatus for transmitting and receiving signals over two pairs of wires. Such methods include all of the various Digital Subscriber Line (DSL) methods as specified in various International Telecommunications Union (ITU) standards and as being further developed in the ITU at present. Typically each such pair of wires comprises a twisted metallic pair (usually copper) as commonly found within telephone access networks throughout the world.

BACKGROUND

It is not uncommon for a user's premises to be connected to a public telephone system via a pair of twisted pairs (i.e. 4 wires in total). Usually one such pair is redundant as only a single pair is needed to provide Plain Old Telephony Services (POTS) or DSL services. However, there have been many proposals for how best to utilise the redundant pair in such a case. These proposals range from the very straightforward approach of using each pair as a separate DSL connection and "bonding" the connections (bonding is discussed in slightly more detail below) through to more exotic and speculative approaches such as that described in EP 1 733 550 in which just one of the 4 wires is used as a reference wire and 3 channels are formed each carrying a different signal relative to the single common reference wire which are then "vectored" and bonded. Bonding involves combining the separate underlying channels at a layer above the physical layer (e.g. at the transport or network layer (OSI model) or (approximately equivalently) at the TCP/IP layer) to present to the application layer a single connection having a data rate approximately equal to the sum of the individual data rates of the underlying connections. Vectoring is a well-known DSL technique which is briefly discussed below after firstly discussing DSL generally.

DSL technology takes advantage of the fact that although a legacy twisted metallic pair (which was originally installed to provide merely a Plain Old Telephone Services (POTS) telephony connection) might have been intended to carry signals at frequencies of only up to a few Kilohertz, in fact such a line can often reliably carry signals at much greater frequencies. Moreover, the shorter the line, the greater is the range of frequencies over which signals can be reliably transmitted (especially with the use of technologies such as Discrete Multi-Tone (DMT), etc.). Thus as access networks have evolved, telecommunications network providers have expanded their fibre optic infrastructure outwards towards the edges of the access network, making the lengths of the final portion of each connection to an end user subscriber (which is still typically provided by a metallic twisted pair) shorter and shorter, and thus giving rise to correspondingly greater and greater bandwidth potential over the increasingly short twisted metallic pair connections—without having to bear the expense of installing new optic fibre connections to each subscriber.

However, a problem with using high frequency signals is that a phenomenon known as crosstalk can cause significant interference, reducing the effectiveness of lines to carry high bandwidth signals in situations where there is more than one metallic pair carrying similar, high-frequency, signals in close proximity to one another. In simple terms, the signals from one wire can "leak" onto a nearby line carrying similar signals and appear as noise to the other line. Although crosstalk is a known problem even at relatively low frequencies, the magnitude of this effect tends to increase with frequency to the extent that at frequencies in excess of a few tens of Megahertz (depending on the length of the lines in question), the indirect coupling (e.g. from a near end of a second line to a remote end of a first line) can be as great as the direct coupling (e.g. from the near end of the first line to the remote end of the first line).

In order to alleviate the problems caused by crosstalk (especially Far End CrossTalk or "FEXT" as it is known) a technology known as vectoring has been developed in which knowledge of the signals sent over crosstalking lines is used to reduce the effects of the crosstalk. In a typical situation a single DSLAM acts as a co-generator of multiple downstream signals over multiple crosstalking lines and also as a co-receiver of multiple upstream signals from the same multiple cross-talking lines, with each of the lines terminating at a single Customer Premises Equipment (CPE) modem such that no common processing is possible at the CPE ends of the lines. In such a case, downstream signals are pre-distorted to compensate for the expected effects of the crosstalking signals being sent over the neighbouring cross-talking lines such that at reception at the CPE devices the received signals are similar to what would have been received had no crosstalking signals been transmitted on the crosstalking lines. Upstream signals on the other hand are post-distorted (or detected in a manner equivalent to their having been post-distorted) after being received at the co-receiver (the DSLAM) in order to account for the effects of the cross-talk which has leaked into the signals during their transmission.

It has been known in theory for a long time (see for example "DSL Advances" by Starr, Sorbara, Cioffi and Silverman published by Prentice Hall 2003—p. 344 and reference to "full vectoring") that improved cross-talk cancellation can be achieved if it is possible to coordinate the signals at both ends of the coordinated channels (see also p. 373 and FIGS. 11.38 and 11.39 of the same reference where it explains that "when either end of the link can be coordinated at that same end, then NEXT [Near End Cross Talk] can be cancelled with a simple multidimensional echo canceler" (thus removing the need to transmit upstream and downstream signals at different frequencies and thus potentially increasing the overall data rates considerably—ignoring the impact of regulations specifying Power Spectral Density (PSD) masks for telephony products located in an access network)).

Such vectoring techniques can deal very successfully with situations where the indirect coupling is significantly weaker than the direct coupling. However, as the relative strengths of the direct and indirect coupling approach each other, vectoring is less able to function effectively.

WO2013026479 applied for by Ericsson proposes a method of transmitting signals in such a situation (i.e. where an indirect coupling is comparable to a direct coupling for a given line) which involves transmitting signals intended for reception by a single CPE device (a first CPE device) onto both the line directly coupled to the first CPE device and onto a crosstalking line coupled only indirectly to the first CPE device (it being directly coupled to a second CPE device). A Time Division Multiplexing (TDM) method is used to enable data to be sent (in different time slots) to the two respective CPE devices (with data being sent over both wires at the same time to only one of the CPE devices at a time). In order to ensure that the two signals constructively interfere at the receiving CPE device, the same signal as sent over one line is pre-distorted (e.g. to introduce a delay and/or phase change) before being sent over the other to account for changes in the direct vs the indirect coupled paths.

EP2091196 by Alcatel-Lucent provides a method to inject signals into the phantom mode formed between two Twisted Metallic Pairs (TMPs). The injected signals are the same as those sent onto one of the TMPs, but phase-rotated so that when converted and coupled into the differential mode, they interfere constructively with the signals sent directly over the respective one of the TMPs in the normal differential mode.

WO 2005/004429 by Globespan Virata Inc describes a method for transmitting data over at least two bonded channels in a flexible manner which provides multiplexing when possible and exploits diversity when needed to improve resilience. In particular the method may comprise transmitting a first symbol stream over a first tone in a first bonded channel and over a second tone in a second bonded channel, wherein the first tone is bonded to the second tone, and the transmissions over the first tone and the second tone are substantially parallel; transmitting a second symbol stream over a third tone in the first bonded channel; and transmitting a third symbol stream over a fourth tone in the second bonded channel, wherein the third tone is bonded to the fourth tone, and the transmissions of the second symbol stream and the third symbol stream are substantially in parallel.

SUMMARY

According to a first aspect of the present invention, there is provided a method of transmitting data between an upstream transceiver and a downstream transceiver via two pairs of wires extending between the transceivers, the upstream transceiver including first and second transmitter portions and the downstream transceiver including first and second receiver portions for receiving signals transmitted by the upstream transceiver in a differential mode, the method comprising: transmitting, from the upstream transceiver to the downstream transceiver, using a discrete multi-tone protocol capable of using (up to) a (predetermined) number of different tones, a data signal in which (in respect of at least a first subset of the tones usable by the protocol) related signals are transmitted onto both pairs of wires in a differential mode, and each of the first and second receiver portions receives the signals, converts them into the frequency domain (in the normal manner for the discrete multi-tone protocol employed) and then processes the resulting signals using frequency domain equalisation coefficients calculated in dependence upon estimated channel transfer functions associated with the direct differential mode channels between the corresponding transmitter portion and each respective receiver portion and additionally in dependence upon estimated channel transfer functions associated with the crosstalk channels between the other transmitter portion and each receiver portion.

(In other words the frequency domain equalisation coefficients used by the first receiver portion depend upon the estimated channel transfer functions of: 1) the direct channel between the first transmitter portion and the first receiver portion and 2) the crosstalk channel between the second transmitter portion and the first receiver portion; similarly, the frequency domain equalisation coefficients used by the second receiver portion depend upon the estimated channel transfer functions of: 1) the direct channel between the second transmitter portion and the second receiver portion and 2) the crosstalk channel between the first transmitter portion and the second receiver portion.)

The above set out method of the first aspect of the present invention whereby a common signal is received at two connected/collocated receivers and each received version of the common signal is equalised in the frequency domain using equalisation coefficients which depend upon direct and indirect transmission path channel transfer functions may hereinafter be referred to as a multi path common signal DSL reception mode of operation.

The related signals are preferably related in the sense that they are encoding the same data in the same manner. Thus if the two signals are identical as is the case in some embodiments, they are clearly related. However, in addition, in some embodiments the signals may be pre-coded in a manner which makes the signals slightly different from one another after the pre-coding (e.g. differing in phase) but they are still related in the sense that they encode the same data to be transmitted in the same way (e.g. using the same QAM modulation constellations and constellation mapping, etc.).

It should be noted that the terms upstream and downstream are here being used just to indicate that when a first transceiver is operating as the transmitter it is the upstream transceiver and the other transceiver (which is receiving the transmitted signals) is operating as the downstream transceiver. However, in most embodiments, each transceiver will include transmitter portions and receiver portions and the system will operate in basically the same way whichever way data is being transmitted, with the roles of upstream and downstream transceiver simply being reversed depending on the direction of transmission of the data signals.

Preferably, after processing the received signals using the frequency domain equalisation coefficients, the resulting signals are added together (or otherwise combined in some manner) to form a combined recovered signal which is processed to obtain the transmitted data. Preferably the further processing comprises performing QAM demodulation. Clearly, for such QAM demodulation (after combining the two received signals) to function (in a manner which is an improvement over performing the QAM demodulation on the individual recovered signals independently of one another), the recovered signals must be sufficiently closely related to one another for this to be a useful thing to do. Such a method of operation may hereinafter be referred to as a Combined Multi-path Related Signal DSL Reception (CMRSDR) mode of operation. Most preferably, prior to adding the signals they are weighted according to weighting values generated in dependence upon the estimated channel transfer functions used in determining the frequency domain equalisation coefficients. Preferably the weighting values are generated so as to seek to maximise the signal to noise ratio of the combined signal. As will be appreciated by persons skilled in the art, this can be done using techniques known as maximal ratio combining which are well known in the domain of wireless communications in which multiple diverse over air channels typically exist.

In this way, the signal to noise ratio of the combined signal is greater than the signal to noise ratio that can be achieved using either direct channel on its own.

Preferably, the system is operable to use vectoring techniques for some tones and CMRSDR techniques for other tones. Preferably, vectoring tones are used for tones below a predetermined cut-off frequency whilst CMRSDR is used above the predetermined cut-off frequency.

To this end, the downstream transceiver preferably includes a Vectoring/CMRSDR switch mechanism which is operable to switch the output signals from the Fast Fourier Transform (FFT) module (which converts the received signal to the frequency domain in the well-known manner) to either a CMRSDR Frequency domain EQualiser (FEQ) followed by a combiner (for combining the equalised, related signals from both receivers to generate a combined equalised signal) or else to a conventional Frequency-domain EQualiser (FEQ) (such as conventionally used by a conventional DSL end-user modem). Preferably, the switch mechanism is operable to switch outputs from the FFT to one or other of the specified destinations from the switch mechanism (i.e. either the CMRSDR FEQ or the conventional FEQ) on a tone by tone basis. Preferably this is able to be coordinated with the upstream transceiver such that the selection of tones to use in the CMRSDR mode and those to use in the conventional (e.g. vectored) mode can be changed over time in order to adapt to changes in the noise environment. For example if a single cut-off frequency is employed to demarcate between tones to be used in the CMRSDR mode and tones to be used in a conventional (e.g. vectored) mode, the downstream transceiver is preferably operable to receive a signal from the upstream transceiver informing it to change the cut-off frequency to a new specified frequency at a new specified time in order to respond to a change in the external noise environment or in the transmission properties of the connecting lines (e.g. if the attenuation at certain frequencies increases above a threshold or if the amount of external noise/interference at some frequencies increases above a threshold, then the cut-off frequency may advantageously be lowered to increase the number of tones employing CMRSDR and reducing the number of tones employing vectoring).

It will be appreciated that although in general so long as one has two versions of a received signal with differing noise but with an approximately equal SNR and with the SNR being greater than unity, then in general a combined version of these "noisy signals" will tend to have an improved SNR compared to either individual signal on its own. However, if the SNR of one signal is much worse than the other one then it may be better to simply rely on the single signal with the best SNR. Thus the method at the downstream transceiver may monitor the SNR of both the received signals before combining them and the signals after combining them (i.e. the single combined signal) and make a determination as to whether or not to combine the signals at all if combining the signals leads to a worsening of the SNR compared to demodulating just a single one of the received signals on its own. The skilled reader will appreciate that this is of course just an extreme example of weighting the signals prior to combining them with a weighting of 1 for the sole signal to be relied upon and a weighting of zero for the other signal to be simply discarded. The well-known MRC principle does tend to set a low weighting for noisy signals; however, in a preferred embodiment a threshold as a proportion of the SNR of the better signal is set and if the SNR of the noisier signal falls below this threshold it is disregarded completely (or equivalently assigned a weighting of zero). The threshold could for example be set at a 10 dB difference in strength between the two SNR's but an optimum value for a particular system can be selected based on a trial and error procedure.

Naturally, there will be a delay between assessing the SNR of the different signals (i.e. each signal on its own prior to combining and the combined signal) and implementing the decision as to which signal to use and/or what weighting values to ascribe to the signals (preferably based on the well-known MRC principle for combining the signals to maximise the signal to noise ratio of the combined signal bearing in mind the preferred use of a cut-off threshold below which the weighting for the noisier signal is set to zero). What is advantageous though for the efficient operation of the method is for the different signals to be assessed for their SNR properties from time to time regardless of which signals are currently being used for data detection purposes and regardless of the current weightings.

The SNR measurements (which may be obtained using any conventional method typically based on assessing the number of errors obtained when decoding a pilot tone and/or sync symbol) may also be preferably used to determine whether, for each tone, it is more suited to being used in a CMRSDR or a conventional (e.g. vectored) mode. Typically, if for a given tone, both direct paths can support 2 or more bits per symbol, then vectoring is likely to be the best mode, if one path can support 2 or more bits but the other can't then depending on the discrepancy in SNR between the two different paths the best approach may be to perform MRC precoding to benefit the best performing path and to simply discard (or apply zero weighting) to the other received signal, or the best option may be to perform MRC precoding to benefit the worse performing path and then to combine the signals from both parts, or finally the best option may be to not perform MRC precoding at all and to still combine the received signals (where the SNR level is approximately equal). Since in preferred embodiments, the particular option can be selected and applied on a tone by tone basis, the system has great flexibility to adopt the best solution for the particular conditions applicable to each tone.

Although the above described first aspect specifies that the method relates to transmitting data over two pairs of wires, it is of course possible for the method to be applied in cases where there are more than two pairs of wires connecting the transceivers together, and the reader will understand that such cases are not intended to be excluded by wording explicitly relating to two pairs of wires (since a system comprising three or more pairs of wires necessarily also includes two pairs of wires). Thus methods operating in accordance with the first aspect may include using more than two connecting pairs of wires and correspondingly more than two upstream transmitter portions and downstream receiver portions, etc. One such embodiment may employ Ethernet type cables (e.g. cat 5, cat 6 etc. cables) carrying four twisted pairs of copper wires. In such a case, it is preferred if the upstream transceiver comprises four transmitter portions and the downstream transceiver comprises four corresponding receiver portions. Preferably in such an embodiment, the switch mechanism is operable to switch each received signal output by each FFT module of each receiver portion, at each tone, independently of each other received signal (at each tone) such that different combinations of signals from different paths at different tones may be formed. Thus if two of the paths are unable to transmit efficiently in a conventional vectored mode at a certain tone (or set of tones) then they may be switched into a CMRSDR mode (for that tone or tones) whilst the other two paths continue to operate in a vectored direct path mode for that tone or set of tones. In such a case it is preferable if the vectoring coefficients for use in the vectoring precoder(s) are recalculated for such tones in a manner which treats the two paths operating in the CMRSDR mode as a single path carrying a single signal, thus rendering the vectoring problem somewhat simpler for those tones compared to the case where all four lines are treated as forming the vectored group since the vectored group is now considered to comprise only three lines and associated signals.

Preferably (regardless of the number of pairs of wires connecting the upstream transceiver to the downstream one), the upstream transceiver is operable to perform the following functions: generating channel estimations based on measurements made at either or both of the upstream or downstream transceiver (the channel estimations including channel estimations of both direct and indirect channels); determining which tones should be used in a CMRSDR mode and which in a vectored mode (which may therefore comprise determining an appropriate cut-off frequency in some embodiments); communicating with the downstream transceiver information about which tones for each receiver portion are to be used in a CMRSDR mode and which in an alternative mode (or modes—e.g. a vectored mode); generating appropriate vectoring coefficients for the use when the transmitter portions are performing vectoring based on the generated channel estimations; and informing a vectoring precoder module within the upstream transceiver of which tones are to have vectoring applied and of the appropriate vectoring coefficients for those tones. In some embodiments, the upstream transceiver may additionally comprise a Maximum Ratio Combiner (MRC) precoder module for performing precoding to cause the directly received signal to a predetermined one of the receiver portions in the downstream transceiver to arrive at the predetermined receiver portion in phase with at least one indirectly received signal arriving at the predetermined receiver portion. The indirectly received signal may for example be a signal transmitted by a transceiver portion which is not directly coupled to the predetermined receiver portion (and thus reaches the predetermined receiver portion by crosstalking across to the predetermined receiver portion (possibly via the pair directly connected to the predetermined receiver portion)). Alternatively, the indirectly received signal could be one transmitted onto a phantom mode channel with a non-negligible coupling to the direct transmission path between the predetermined receiver portion and the transmitter portion directly coupled thereto.

A second aspect of the present invention relates to a system for transmitting data between an upstream transceiver and a downstream transceiver via two (or more) pairs of wires extending between the transceivers, the system comprising: the upstream transceiver which includes first and second transmitter portions; the downstream transceiver which includes first and second receiver portions for receiving signals transmitted by the upstream transceiver in a differential mode; and the two pairs of wires extending between the transceivers; wherein the upstream transceiver is operable to transmit, to the downstream transceiver, using a discrete multi-tone protocol capable of using up to a (predetermined) number of different tones, a data signal in which (in respect of at least a first subset of the tones usable by the protocol) related signals are transmitted onto both pairs of wires in a differential mode, such that, in use, each of the first and second receiver portions receives a respective one of the transmitted signals after modification by the channel together with some portion of the other related signal (having crosstalked from the one pair to the other); and wherein each receiver portion includes a Fast Fourier Transform (FFT) module for converting the received signal into the frequency domain (in the normal manner for the discrete multi-tone protocol employed) and a frequency domain equaliser for further processing the resulting signal using frequency domain equalisation coefficients calculated in dependence upon estimated channel transfer functions associated with the direct differential mode channels between the corresponding transmitter portion and the respective receiver portion and additionally in dependence upon estimated channel transfer functions associated with the crosstalk channels between the other transmitter portion and the respective receiver portion (in other words the frequency domain equalisation coefficients used by the first receiver portion depend upon the estimated channel transfer functions of: 1) the direct channel between the first transmitter portion and the first receiver portion and 2) the crosstalk channel between the second transmitter portion and the first receiver portion; similarly, the frequency domain equalisation coefficients used by the second receiver portion depend upon the estimated channel transfer functions of: 1) the direct channel between the second transmitter portion and the second receiver portion and 2) the crosstalk channel between the first transmitter portion and the second receiver portion).

Preferably, the downstream transceiver further comprises a signal combiner for combining the signals output by each of the frequency domain equalisers of the receiver portions (i.e. after the processing of the received signals using the frequency domain equalisation coefficients) (e.g. by adding the resulting signals together or otherwise combining them in some manner) to form a combined recovered signal which is then further processed (e.g. by a QAM demodulator) to obtain the transmitted data.

Preferably, the downstream transceiver further comprises a (Vectoring/CMRSDR) switch mechanism which is operable to switch the output signals from the Fast Fourier Transform (FFT) module (which converts the received signal to the frequency domain in the well-known manner) to either a CMRSDR Frequency domain EQualiser (FEQ) followed by the combiner (for combining the equalised, related signals from both receivers to generate a combined equalised signal) or else to a non-CMRSDR Frequency-domain EQualiser (FEQ) (such as conventionally used by a conventional DSL end-user modem). Preferably the non-CMRSDR FEQ is a vectoring FEQ as used in conventional vectored DMT (Discrete Multi-Tone) modems.

Such a system may hereinafter be referred to as a Combined Multi-path Related Signal DSL (or DMT) Reception (CMRSDR) system. Most preferably, the signal combiner is further operable to apply weightings to the signals prior to (or as part of) their being combined. Preferably, the combiner is operable to weight the signals according to weighting values generated in dependence upon the estimated channel transfer functions used in determining the frequency domain equalisation coefficients. Preferably the weighting values are generated so as to seek to maximise the signal to noise ratio of the combined signal. As will be appreciated by persons skilled in the art, this can be done using techniques known as maximal ratio combining which are well known in the domain of wireless communications in which multiple diverse over air channels typically exist.

According to a third aspect of the present invention, there is provided a transceiver, suitable for use as the downstream transceiver of the second aspect, comprising: first and second receiver portions for receiving signals transmitted by an upstream transceiver in a differential mode over two pairs of wires extending to the transceiver from the upstream transceiver; wherein the upstream transceiver is operable to transmit, to the (downstream) transceiver, using a discrete multi-tone protocol capable of using up to a (predetermined) number of different tones, a data signal in which (in respect of at least a first subset of the tones usable by the protocol) related signals are transmitted onto both pairs of wires in a differential mode, such that, in use, each of the first and second receiver portions is operable to receive a respective one of the transmitted signals after modification by the channel together with some portion of the other related signal (having crosstalked from the one pair to the other); and wherein each receiver portion includes a Fast Fourier Transform (FFT) module for converting the received signal into the frequency domain (in the normal manner for the discrete multi-tone protocol employed) and a frequency domain equaliser for further processing the resulting signal using frequency domain equalisation coefficients calculated in dependence upon estimated channel transfer functions associated with the direct differential mode channels between the corresponding transmitter portion and the respective receiver portion and additionally in dependence upon estimated channel transfer functions associated with the crosstalk channels between the other transmitter portion and the respective receiver portion.

Preferably, the transceiver further comprises a signal combiner for combining the signals output by each of the frequency domain equalisers of the receiver portions (i.e. after the processing of the received signals using the frequency domain equalisation coefficients) (e.g. by adding the resulting signals together or otherwise combining them in some manner) to form a combined recovered signal which is then further processed (e.g. by a QAM demodulator) to obtain the transmitted data.

Preferably, the transceiver further comprises a Vectoring/CMRSDR switch mechanism which is operable to switch the output signals from the Fast Fourier Transform (FFT) module (which converts the received signal to the frequency domain in the well-known manner) to either a CMRSDR Frequency domain EQualiser (FEQ) followed by the combiner (for combining the equalised, related signals from both receivers to generate a combined equalised signal) or else to a non-CMRSDR Frequency-domain EQualiser (FEQ) (such as conventionally used by a conventional DSL end-user modem). Preferably the non-CMRSDR FEQ is a vectoring FEQ as used in conventional vectored DMT (Discrete Multi-Tone) modems.

Preferably, the transceiver further comprises an SNR monitor for monitoring the SNR of both the received signals before combining them and the signals after the received signals have been combined and for making a determination as to whether or not to combine the signals at all if combining the signals leads to a worsening of the SNR compared to demodulating just a single one of the received signals on its own.

According to a fourth aspect of the present invention, there is provided a transceiver, suitable for use as the upstream transceiver of the second aspect of the present invention, comprising: first and second transmitter portions each of which is able, when in use, to be connected to a respective pair of wires each of which in turn is able to be connected to first and second receiver portions respectively of a downstream transceiver for receiving signals transmitted by the upstream transceiver in a differential mode; wherein the first transmitter portion includes a first discrete multi-tone transmitter for transmitting, when in use, to the first receiver portion of the downstream transceiver, using a discrete multi-tone protocol capable of using up to a predetermined number of different tones, in respect of a first subset of the tones usable by the protocol, a first set of signals carrying a first set of data, and in respect of a second, distinct, subset of the tones usable by the protocol, a third set of signals carrying a third set of data onto the pair of wires extending between the first transmitter portion and the first receiver portion; and wherein the second transmitter portion includes a second discrete multi-tone transmitter for transmitting, when in use, to the second receiver portion of the downstream transceiver, using the same discrete multi-tone protocol as the first transmitter portion, in respect of the first subset of the tones usable by the protocol, a second set of signals carrying a second set of data which is different to the first set of data, and in respect of the second subset of the tones usable by the protocol, a fourth set of signals, which are related to the third set of signals and carry the same third set of data as that carried by the third set of signals onto the pair of wires extending between the second transmitter portion and the second receiver portion; and wherein the transceiver additionally comprises a controller for communicating with the downstream transceiver so as to negotiate which tones are included in the first subset and which in the second subset and to coordinate a change in the composition of the first and second subsets in order to take into account changes in the channel or the noise environment whereby as the channel conditions or noise environment worsen tones are taken out of the first subset and placed into the second subset.

By taking tones out of the first subset and placing them into the second subset when the channel or noise environment worsens, tones which cease to be viable or efficient in a conventional single channel made (e.g. a vectored mode) can be swapped into the CMRSDR mode so that some data transfer can still be supported on those tones.

In some embodiments, the third and fourth set of signals generated by the transceiver of the fourth aspect are identical.

In some alternative embodiments, the transceiver of the fourth aspect further comprises a maximum ratio combiner precoder module for precoding the third and fourth signals so that they are different although still related as they still encode the same third set of data in the same way (e.g. using the same QAM constellations and constellation mappings) but are phase rotated such that the directly received signal to a predetermined one of the receiver portions in the downstream transceiver arrives at the predetermined receiver portion in phase with at least one indirectly received signal arriving at the predetermined receiver portion. The indirectly received signal may for example be a signal transmitted by a transceiver portion which is not directly coupled to the predetermined receiver portion (and thus reaches the predetermined receiver portion by crosstalking across to the predetermined receiver portion (possibly via the pair directly connected to the predetermined receiver portion)). Alternatively, the indirectly received signal could be one transmitted onto a phantom mode channel with a non-negligible coupling to the direct transmission path between the predetermined receiver portion and the transmitter portion directly coupled thereto.

Preferably, the transceiver additionally includes an SNR monitor for either monitoring the SNR of the received signals or for receiving an indication of the measured SNR of the received signals as determined by the downstream transceiver, and for passing this information to the controller for its use in determining which tones to include in the first subset of tones and which to include in the second subset of tones, and, in some embodiments, for further use in determining on which tones in the second subset to apply MRC precoding.

In an embodiment, the system comprises an access node comprising an upstream transceiver according to the fourth aspect of the present invention and a customer premises equipment modem device comprising a downstream transceiver according to the third aspect of the present invention, connected together via two twisted metallic pairs of wires.

Most preferably, the access node is operable to operate in accordance with a G.FAST protocol. Preferably, the upstream transceiver in the access node is additionally operable as a downstream transceiver for data sent from the customer premises equipment modem device to the access node and therefore includes first and second receiver portions as set out in the third aspect and similarly the downstream transceiver of the customer premises modem device is additionally operable to operate as an upstream transceiver according to the fourth aspect, and to therefore include first and second transmitter portions in addition to its first and second receiver portions, in respect of data sent from the customer premises modem device to the access node.

As mentioned above, aspects of the present invention relate to apparatus for carrying out the method of the first aspect, in particular in the form of modems such as end-user modems and Access Nodes (ANs) (such as Digital Subscriber Line Access Multiplexors (DSLAMs)) especially such modems which are operable to communicate in accordance within a G.FAST protocol and are deployable across groups of two or more short twisted metallic pairs extending between a drop point and a user's premises such that the twisted metallic pairs have a length of less than 500 meters and most preferably about 250 meters or less. An additional aspect relates to processor implementable instructions for causing a modem or modems to perform the method of the first aspect of the invention; similarly, further aspects relate to a carrier medium (especially a non-transient carrier medium such as an optical or magnetic storage device (such as a floppy disk, a hard drive, a CD or a DVD) or a solid state memory device such as an SSD drive or a USB thumb-drive, etc.).

BRIEF DESCRIPTION OF THE FIGURES

In order that the present invention may be better understood, embodiments thereof will now be described, by way of example only, with reference to the accompanying figures in which.

SPECIFIC DESCRIPTION OF EMBODIMENTS OF THE INVENTION

Figure 1:
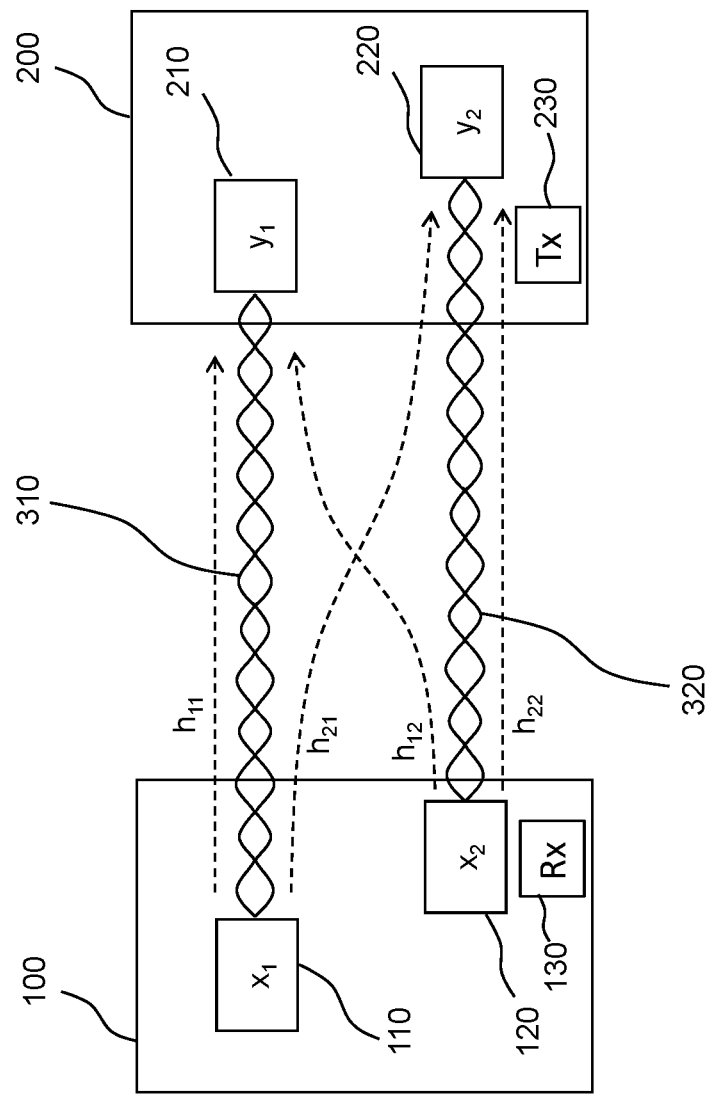
FIG. 1 is a schematic illustration of an the basic elements of embodiments of the present invention illustrating an upstream transceiver comprising first and second transmitter portions, a downstream transceiver comprising first and second receiver portions and two twisted pairs of wires connecting the first transmitter portion to the first receiver portion and the second transmitter portion to the second receiver portion respectively.

FIG. 1 illustrates the basic components common to both the first and second embodiments described in greater detail below with reference to FIGS. 2 and 3 respectively. As can be seen from FIG. 1, the system comprises an upstream transceiver 100 which contains a first transmitter portion 110, a second transmitter portion 120 and a receiver portion 130, a downstream transceiver 200 which includes a first receiver portion 210, and a second receiver portion 220 and a transmitter portion 230, a first interconnecting twisted metallic pair of wires 310 and a second twisted metallic pair of wires 320. The four channels of interest in the system illustrated schematically in FIG. 1 are also shown as dashed lines labelled $h_{11}$, $h_{21}$, $h_{12}$ and $h_{22}$ indicate the two direct (differential mode) channels and the two indirect crosstalk channels between the transmitter and receiver portions. In particular $h_{11}$ indicates the direct channel between the first transmitter portion 110 and the first receiver portion 210 (in particular, the letter h is conventionally used to designate the channel transfer function); $h_{21}$ indicates the crosstalk channel from the first transmitter portion 110 to the second receiver portion 220; $h_{12}$ indicates the crosstalk channel from the second transmitter portion 120 to the first receiver portion 210; and $h_{22}$ indicates the direct channel between the second transmitter portion 120 and the second receiver portion 220.

This setup can be represented mathematically for a (hypothetical) noise free system (where noise refers to external noise rather than crosstalk noise, since crosstalk noise is being explicitly represented) by equation (1):

$$y=Hx \tag{1}$$

or alternatively:

$$\begin{pmatrix} y_1 \\ y_2 \end{pmatrix} = \begin{pmatrix} h_{11} & h_{12} \\ h_{21} & h_{22} \end{pmatrix} \begin{pmatrix} x_1 \\ x_2 \end{pmatrix}$$

Where H is a 2×2 matrix which contains the coupling/channel coefficients between the transmitter portions 110, 120 and the receiver portions 210, 220 via the pairs 310, 320. As in FIG. 1 and as mentioned above, $h_{11}$ and $h_{22}$ represent the direct paths between the first transmitter and first receiver portions and between the second transmitter and the second receiver portions respectively; while $h_{21}$ and $h_{12}$ represent the crosstalk couplings from the first transmitter portion 110 to the second receiver portion 220 and from the second transmitter portion 120 to the first receiver portion 210 respectively; x and y are column vectors which contain the transmitted symbols $x_1$ and $x_2$ and the received symbols $y_1$ and $y_2$ respectively—note that $x_1$ is the symbol transmitted by the first transmitter portion 110 onto the first pair 310 and $x_2$ is the symbol transmitted by the second transmitter portion 120 onto the second pair 320, while $y_1$ is the symbol received (in differential mode) by the first receiver portion 210 and $y_2$ is the symbol received (in differential mode) by the second receiver portion 220.

For simplicity, the (idealised) system model described above is used throughout the present specification to more clearly illustrate the functioning of preferred embodiments, and then later an explanation is given as to how to accommodate real systems in which external noise is present and affects the operation of real embodiments. In addition, the description of the embodiments considers only downstream transmissions (from the upstream transceiver to the downstream transceiver). However, the implementation of receivers in the upstream transceiver and transmitters in the downstream transceiver is symmetrical to the downstream operation and does not therefore need to be explicitly explained any further.

First Embodiment

Figure 2:
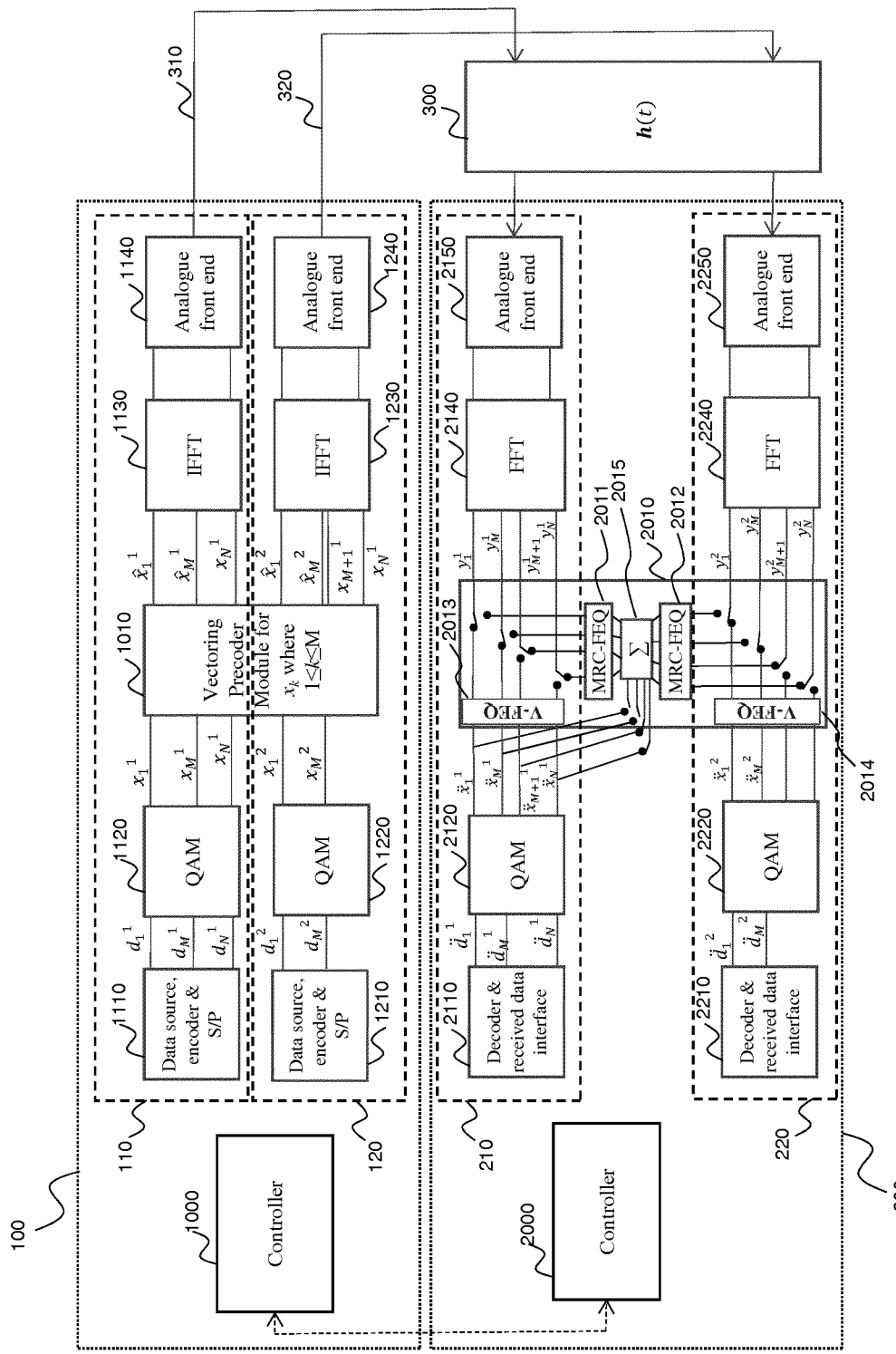
FIG. 2 is a schematic block diagram illustrating the principal components of the system of FIG. 1 in accordance with a first embodiment.

Referring now to FIG. 2, there is shown a schematic illustration of the principal components within the upstream transceiver 100 and the downstream transceiver 200 of FIG.

1 according to a first embodiment. Thus, as shown, the upstream transceiver 100 of the first embodiment in FIG. 2 includes a controller 1000, a first transmitter portion 110 and a second transmitter portion 120. Note that there is a single vectoring precoder module 1010 for the upstream transceiver 100 which is shared between both the first and the second transmitter portions (since, as is will be readily appreciated by the skilled person, the vectoring precoder module needs to know the signals intended for transmission over all lines within a vectored group—which in this example is both of the lines 310 and 320). As is also shown in FIG. 2, the interconnecting twisted pair connections 310 and 320 extend, respectively, between the first and second transmitter portions 110 and 120 to the first and second receiver portions 210 and 220 in the downstream transceiver 200. As is shown in FIG. 2, the downstream transceiver 200 comprises a controller 2000, the first receiver portion 210 and the second receiver portion 220; similarly to the upstream transceiver, the downstream transceiver additionally includes a shared module, which in this case is a frequency domain equaliser and combiner module 2010. The functionality and functional structure of this module is described in greater detail below after briefly setting out the other components within each of the transmitter and receiver portions.

Each of the first and second transmitter portions contain a data source, encoder and serial to parallel conversion module 110 and 120 respectively; a first and second QAM modulator module 1120 and 1220 respectively, a shared vectoring precoder module 1010; a first and second IFFT module 1130 and 1230 respectively and a first and second upstream analogue front end module 1140 and 1240. Each of the first and second receiver portions 210 and 220 contain a first and second downstream analogue front end module 2150 and 2250 respectively; a first and second FFT module 2140, 2240 respectively; a shared frequency domain equaliser and signal combiner module 2010; a first and second QAM demodulator module 2120, 2220 respectively; and first and second decoder and received data interface modules 2110 and 2210 respectively.

As just mentioned, each of the first and second transmitter portions 110 and 120 contain a data source, encoder and serial to parallel conversion module 110 and 1210 respectively. These produce the segments of data (arranged in groups of bits appropriate for the QAM modulation being employed for the corresponding tone—e.g. if tone 1 is deemed able to support 8 bits per symbol, the data source, encoder and serial to parallel conversion module 110 generates a group of 8 bits, $d_1^1$, where the subscript indicates that this is the data group for tone 1 and the superscript indicates that it is from the first transmitter portion 110 as opposed to the second transmitter portion 120. the data segments $d_1^1$ to $d_N^1$ and $d_1^2$ to $d_M^2$ are then forwarded to respective QAM (Quadrature Amplitude Modulation) modules 1120 and 1220 which map each data segment to a corresponding constellation point to generate complex numbers $x_1^1$ to $x_N^1$ and $x_1^2$ to $x_M^2$ respectively (representing the mapped-to constellation points). These values are then passed to the shared vectoring precoder module 1010.

At this point it should be noted that in the presently considered example, it is assumed that the system has determined that tones 1 through M are to be transmitted using a conventional vectored mode of operation (and thus correspond to the claimed second subset of tones) whilst tones M+1 through N are to be transmitted using a CMRSDR mode (and thus tones M+1 through N constitute the claimed first subset of tones). In preferred embodiments, the selection of which tones are to be used in which mode is made based on an assessment of the viability of sending data in vectored modes over the tones in question—for example, where the average number of bits per tone for all tones greater than tone M (i.e. for tones M+1 to tone N) falls below a predetermined number such as one or two, then M can be selected as a cut-off tone above which a CMRSDR mode of operation is employed. In this regard, it should further be noted that there is a strong correlation between the ability of vectoring to mitigate against the effects of crosstalk and the relative size of the off-diagonal components of the H matrix mentioned above. Thus in some embodiments, a cut-off tone can be determined based on the point (i.e. tone) where the off-diagonal terms in H start to consistently equal or exceed the diagonal terms. Note that In the CMRSDR mode of operation, only a single set of data segments can be transmitted which is why the second data source encoder and serial to parallel conversion module 1210 only generates data segments $d_1^2$ to $d_M^2$ whilst the first module 1110 generates data segments $d_1^1$ to $d_N^1$ (N being greater than M).

The shared vectoring precoder module 1010 takes the complex values $x_1^1$ to $x_M^1$ and $x_1^2$ to $x_M^2$ and using predetermined vectoring coefficients (derived, for example, in any suitable conventional manner) precodes these to generate precoded values $\hat{x}_1^1$ to $\hat{x}_M^1$ and $\hat{x}_1^2$ to $\hat{x}_M^2$. In addition, the vectoring precoder module in this first embodiment takes the values $x_{M+1}^1$ to $x_N^1$ and supplies these (without modification) to both a first and a second IFFT module in conjunction with the precoded values $\hat{x}_1^1$ to $\hat{x}_M^1$ and $\hat{x}_1^2$ to $\hat{x}_M^2$ respectively.

The IFFT (Inverse Fast Fourier Transform) modules 1130 and 1230 are entirely conventional and operate in the normal manner to convert the respective sets of input complex values from the frequency domain into the time domain for subsequent analogue processing and transmission over a respective twisted metallic pair (310 or 320). In particular, $\hat{x}_1^1$ to $\hat{x}_M^1$ and $\hat{x}_{M+1}^1$ to $\hat{x}_N^1$ are processed by the first IFFT module 1130 and $\hat{x}_1^2$ to $\hat{x}_M^2$ and $\hat{x}_{M+1}^1$ to $\hat{x}_N^1$ are processed by the second IFFT module 1230.

The values (now in the time domain) output from the IFFT modules 1130 and 1230 are then passed respectively to first and second Analogue Front End (AFE) modules 1140 and 1240 which operate in the normal manner to generate from the values output by the IFFT modules signals for transmission over twisted metallic pairs 310 and 320 respectively.

These pass across the twist metallic pairs, the channel properties of which are illustrated in FIG. 2 by the box 300 and correspond (excluding the effects of external noise) to the function h(t) which is the time domain equivalent of the channel transfer matrix H already discussed above. After passing through the channel 300 (including the two TMP's 310 and 320) the signals are received by the first and second receiver portions 210 and 220 respectively where the operations of the components in the transmitter portions are largely reversed to recover the transmitted data as explained below.

Thus, the signals are received at respective analogue front end modules 2150 and 2250 and processed in the normal manner to generate serial to parallel converted values for processing by the FFT (Fast Fourier Transform) modules 2140 and 2240 in the normal manner to generate frequency domain values $y_1^1$ to $y_N^1$ and $y_1^2$ to $y_N^2$ respectively. These are then forwarded to the frequency domain equaliser and signal combiner module 2010. This module performs several functions. Firstly, a series of switches (operating under the control of the controller module 2000 operating in communication with the upstream transceiver controller module 1000 as indicated by the dashed arrow connecting these two controller modules) select whether the signals corresponding to different tones are forwarded to a Vectoring Frequency domain EQualiser (V-FEQ) 2013 or 2014 or to a Maximal Ratio Combining Frequency domain EQualiser (MRC-FEQ) 2011, 2012. Note that values $y_1^1$ to $y_N^1$ derived from signals received by the first receiver portion 210 are passed to either the first V-FEQ 2013 or to the first MRC-FEQ 2011 whilst the values $y_1^2$ to $y_N^2$ derived from signals received by the second receiver portion 220 are passed to either the second V-FEQ 2014 or to the second MRC-FEQ 2012. Moreover, in the present example, the tones 1-M are being transmitted and received in vectoring mode and therefore values $y_1^1$ to $y_M^1$ are passed to the first V-FEQ 2013 whilst tones M+1 to N are being transmitted and received in CMRSDR mode and therefore values $y_{M+1}^1$ to $y_N^1$ are passed by the switches (not individually referenced in the figure) to the first MRC_FEQ 2011. Similarly, for the values derived from signals received by the second receiver portion 220, values $y_1^2$ to $y_M^2$ are passed to the second V-FEQ 2014 whilst values $y_{M+1}^2$ to $y_N^2$ are passed by the switches to the second MRC-FEQ 2012.

The V-FEQ's perform normal frequency domain equalisation based only on channel estimations derived from observing signals received at the corresponding AFE module (2150 for the first V-FEQ 2013 and 220 for the second V-FEQ 2014) after vector precoding has been applied to the transmitted signals. The operation of the precoding module is 1010 is to remove to a large extent the effects of cross talk from the other channel so the crosstalk effects can be largely ignored by the V-FEQ modules. The output values from the first V-FEQ module 2013, $\ddot{x}_1^1$ to $\ddot{x}_M^1$, are then passed to the first QAM demodulator 2120 for QAM demodulation, and the output values from the second V-FEQ module 2014, $\ddot{x}_1^2$ to $\ddot{x}_M^2$, are then passed to the second QAM demodulator 2220 for QAM demodulation. For these latter values $\ddot{x}_1^2$ to $\ddot{x}_M^2$ the story is almost over as the second QAM demodulator 2220 simply maps these back to obtain estimated values for the received data segments $\ddot{d}_1^2$ to $\ddot{d}_M^2$ which, apart from any errors (resulting for example from external noise, etc), should now correspond to the transmitted data segments $d_1^2$ to $d_M^2$; these are then passed to the second decoder and received data interface 2210 which, under the control of the controller 2000, decodes the data and recombines it with data from the first decoder and received data interface 2110 and then passes the received and decoded data to a higher layer application for which the received (and decoded) data is destined. Note that, as is normal, the QAM demodulators may perform some slicing level adjustment based on an assessment of signal to noise ratio and signal strength measurements/estimations of the received signals in the normal manner.

The MRC-FEQ modules 2011 and 2012 perform equalisation of values/signals for which no vectoring precoding has been performed. Therefore, the equalisation coefficients used in these MRC-FEQ's are derived in a manner which explicitly depends upon channel estimations made of both direct and indirect (crosstalk) channels. The exact equations used for this are described below in the mathematical discussion that follows. However, the object is to equalise the signals received both via the direct and the indirect crosstalk paths. This can be done in the present embodiment because the same signal is being transmitted onto the direct channel as well as the indirect (crosstalk channel). It should be noted that it is not necessary for the two signals (transmitted onto the direct and indirect channels) to be exactly the same—the second embodiment described below pre-codes the signals so that they are not the same, but they should be sufficiently related that subsequent combination of the signals after equalisation may result in an improved signal to noise ratio of the combined signal compared to either of the signals prior to their combination.

The values output from the MRC-FEQs 2011 and 2012 are then weighted and summed in the combiner 2015. The weightings are determined based on estimations of the signal to noise ratios and signal strengths of the signals received (on a tone by tone basis) at the two receiver portions 210 and 220 in accordance with the well-known Maximal Ratio Combining principles. The output values $\ddot{x}_{M+1}^1$ to $\ddot{x}_N^1$ are then passed (via switches again not referenced in FIG. 2) to the first QAM demodulator 2120 to be QAM demodulated together with the values $\ddot{x}_1^1$ to $\ddot{x}_M^1$ output by the first V-FEQ 2013. After demodulation, this generates estimated data segments, $\ddot{d}_1^1$ to $\ddot{d}_N^1$ which, barring errors, should correspond to the transmitted data segments $d_1^1$ to $d_N^1$ and, as with data segments $d_1^2$ to $d_M^2$, these are passed to their corresponding decoder and received data interface 2110 (the first one) for decoding and reassembling with data recovered by the second decoder 2210 and then (under the control of the controller 2000) passes the received and decoded data to a higher layer for which the data is destined.

This completes the discussion of the operation of FIG. 2. It should be noted that apart from the analogue front end modules 1140, 1240, 2150, 2250 all of the other modules operate on signals/values in the digital domain and thus in reality are likely to be implemented as software modules operating within a specialised and shared digital signal processor arrangement in the normal manner. Thus, the distinction between first and second transmitter and receiver portions is a functional one rather than a physical one and is illustrated in the manner in which it is in FIGS. 1 and 2 to assist in the understanding of the embodiments rather than intending to be reflective of any real physical separation between the described modules.

It should also be noted that each MRC-FEQ corresponds to the claimed frequency domain equaliser (and not the V-FEQ's which do not use coefficients which depend upon the indirect crosstalk channels between non-corresponding transmitter and receiver portions). Also, the combiner 2015 corresponds to the claimed combiner, the V-FEQ's correspond to the claimed non-CMRSDR FEQ, and the switches (in combination with the controlling controller 2000) correspond to the claimed switch mechanism.

Second Embodiment

Figure 3:
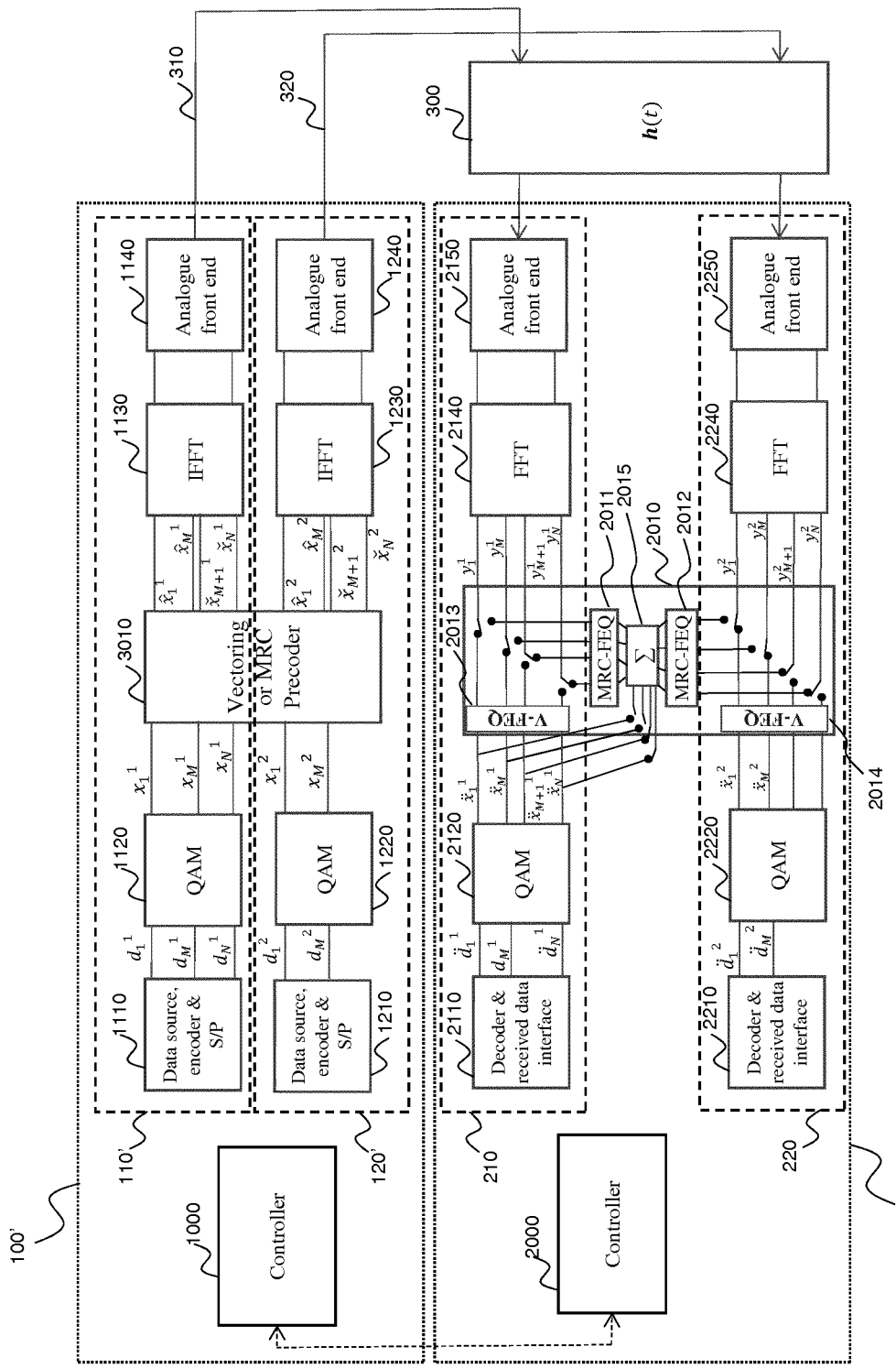
FIG. 3 is a schematic block diagram similar to FIG. 2 illustrating the principal components of the system of FIG. 1 in accordance with a second embodiment.

Turning now to FIG. 3, there is described a more sophisticated embodiment in which precoding is performed in respect of the non-vectored tones in addition to the vectored tones. The precoding for the non-vectored tones is referred to as MRC precoding and operates to align in phase the directly received signal with the indirectly received signal at one (and typically only one) of the receiver portions. The generation of suitable precoding coefficients for this purpose is described below in the mathematical explanation of the operation of the two embodiments.

Thus, in FIG. 3 like reference numerals have been used for like elements (with an apostrophe being used to indicate where a component containing a modified element is distinct from the corresponding component in FIG. 2 by virtue only of the modified element and the only distinction over FIG. 2 is that the precoder module 1010 of FIG. 2 has been replaced with a vectoring or MRC precoder 3010 which now generates different output values thus: the values output to the first IFFT 1130 are, for tones 1 to M unchanged at $\hat{x}^1$ to $\hat{x}_M^1$, but for tones M+1 to N instead of simply forwarding on the received values $x_{M+1}^1$ to $x_N^1$ unchanged it precodes these to generate and forward on to the IFFT 1130 MRC precoded values $\check{x}_{M+1}^1$ to $\check{x}_N^1$; furthermore, the values output to the second IFFT 1230 are, for tones 1 to M again unchanged at $\hat{x}_1^2$ to $\hat{x}_M^2$ (i.e. the input values after vector precoding), whilst for tones M+1 to N they are values $\check{x}_{M+1}^2$ to $\check{x}_N^2$ which are not the same as $\check{x}_{M+1}^1$ to $\check{x}_N^1$ (although they are related to these as they derive from the same QAM constellation values $x_{M+1}^1$ to $x_N^1$) because they have been precoded in a slightly different manner such that after reception of these values at the first receiver portion 210 via the indirect crosstalk path from the second transmitter portion 120' they will be phase aligned with the values received at the first receiver portion 210 via the direct path from the first transmitter portion 110' as explained below in the mathematical explanation.

The only further distinction of the second embodiment is that the manner in which the MRC_FEQ coefficients is calculated is modified slightly in order to perform the necessary phase correction at the second receiver portion—this is again set out below in the mathematical explanation.

Mathematical Explanation

There now follows a brief mathematical explanation of the operation of the first embodiment and subsequently of the second embodiment. It should be noted in what follows that the explanation is given for just a single tone. As such the subscript for tone index is not required and instead the subscript now denotes to which of the first or second transmitter (for x values) or to which of the first or second receiver portion (for y values) the value belongs/relates. This makes the explanation easier to follow where the taking of exponents (e.g. squaring values) is required. Thus a superscript of 2 indicates that the value is raised to the exponent of 2 (i.e. it is squared).

First Embodiment

Here we assume that MRC is applied at the received signal as an example for illustration. To fulfil that, we insert $x_1$ instead of $x_2$, hence equation (1) becomes:

$$\begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_1 \end{bmatrix}, \quad (2)$$

To enable (2) to achieve constructive combining, a row vector G which contains weighting coefficients to pre-compensate for the phase and path loss of the direct and the crosstalk paths is introduced thus:

$$G = \frac{\sum_i h_{ji}^{\mathcal{H}}}{\left| \sum_i h_{ji}^{\mathcal{H}} \right|^2}, \forall j \ \& \ i \leq J, \quad (3)$$

e.g. for $J = 2$, $G = \begin{bmatrix} \frac{h_1^*}{|h_1|^2} & \frac{h_2^*}{|h_2|^2} \end{bmatrix}$, Where $\mathcal{H}$ donates the transpose conjugate of H. Once G is calculated/estimated at the receiver data can be recovered as follows:

$$y_2 = x_2(h_{22} + h_{21}), \quad (4)$$

Where $(h_{22} + h_{21})$ is $h_2$, hence the estimated data $(\ddot{x}_2)$ becomes:

$$\ddot{x}_2 = g_2 * y_2,$$

That is:

$$\begin{bmatrix} \ddot{x}_2 \\ \ddot{x}_2 \end{bmatrix} = \begin{bmatrix} \frac{h_1^*}{|h_1|^2} & \frac{h_2^*}{|h_2|^2} \end{bmatrix} \begin{bmatrix} h_{11} & h_{12} \\ h_{21} & h_{22} \end{bmatrix} \begin{bmatrix} x_2 \\ x_2 \end{bmatrix}, \quad (5)$$

MRC Gain

The combining vector G maximises the signal to noise ratio at receiver 2 by:

$$\rho_2 = \frac{|h_{21}|^2 + |h_{22}|^2}{|h_{22}|^2}, \quad (6)$$

And at receiver 1:

$$\rho_1 = \frac{|h_{11}|^2 + |h_{12}|^2}{|h_{11}|^2}, \quad (7)$$

Intuitively, the gain becomes unity in (5 and 6) when the crosstalk coefficients are zero (i.e. $h_{21} = h_{12} = 0$) or not considered. Also, the stronger it becomes the higher the gain which can be achieved. Likewise, every additional crosstalk path contributes to the SNR gain.

If receiver 1 and 2 are operating together the MRC gain becomes:

$$\rho_T = \rho_1 + \rho_2 = \frac{|h_{11}|^2 + |h_{12}|^2}{|h_{11}|^2} + \frac{|h_{21}|^2 + |h_{22}|^2}{|h_{22}|^2}, \quad (8)$$

Full channel utilisation is achieved by combining receiver 1 and 2.

Signal Tracking of First Embodiment

Channel is given by $$H = \begin{bmatrix} h_{11} & h_{12} \\ h_{21} & h_{22} \end{bmatrix},$$

1) After source of data $$D = \begin{bmatrix} d \\ d \end{bmatrix}$$

(note that in fact we are only considering tones for which CMRSDR is being applied—i.e. tones M+1 to tone N and so only one set of data is generated at the data source and technically the bottom row of the data vector does not exist, but since this second row is effectively created at the precoder it is convenient to include it at this stage of the mathematical analysis since it is mathematically equivalent to what actually occurs)

2) After the QAM $$X = \begin{bmatrix} x \\ x \end{bmatrix},$$

3) After the channel (and conversion to time domain and back again)

$$Y = \begin{bmatrix} h_{11} & h_{12} \\ h_{21} & h_{22} \end{bmatrix} \begin{bmatrix} x \\ x \end{bmatrix} = \begin{bmatrix} x(h_{11} + h_{12}) \\ x(h_{21} + h_{22}) \end{bmatrix} = \begin{bmatrix} xH_1 \\ xH_2 \end{bmatrix}$$

4) At the bonded receivers—note these are assumed to be fully cognisant of the channel, hence frequency domain channel equalisation is applied as follows:

$$\tilde{X} = \begin{bmatrix} y_1 H_1^{-1} \\ y_2 H_2^{-1} \end{bmatrix}$$

5) Sum these signals (i.e. to generate $2\tilde{x}$) so that SNR multiplied by a factor of 2 if $H_1$ and $H_2$ are equal. Finally adjust the slicing level before demodulation.

Numerical Example of First Embodiment

As an example, consider the following numerical example (for a particular tone and symbol) thus:

Channel
$$H = \begin{bmatrix} -0.0021 + 0.0003i & -0.0015 - 0.0002i \\ 0.0008 - 0.0006i & 0.0005 + 0.00032i \end{bmatrix},$$

Data
$$D = \begin{bmatrix} 3 \\ 3 \end{bmatrix},$$

Symbols
$$X = \begin{bmatrix} 1-i \\ 1-i \end{bmatrix},$$

Channel and received symbols
$$Y = \begin{bmatrix} -0.0021 + 0.0003i & -0.0015 - 0.0002i \\ 0.0008 - 0.0006i & 0.0005 + 0.00032i \end{bmatrix} \begin{bmatrix} 1-i \\ 1-i \end{bmatrix} = \begin{bmatrix} -0.0035 + 0.0037i \\ 0.0039 + 0.0013i \end{bmatrix}$$

Equalisation
$$\tilde{X} = \begin{bmatrix} \frac{-0.0035 + 0.0037i}{-0.0036 + 0.0001i} \\ \frac{0.0039 + 0.0013i}{0.0013 + 0.0026i} \end{bmatrix} = \begin{bmatrix} 1-i \\ 1-i \end{bmatrix}$$

Combining
$$\ddot{x} = \rho_1 \cdot \tilde{x}_1 + \rho_2 \cdot \tilde{x}_2 = \rho_1 *(1-i) + \rho_2 *(1-i) = 1-i$$

(since $\rho_1 + \rho_2 = 1$)

Demodulation $\ddot{d} = 3$

Second Embodiment

MRC Implemented as Pre-Coding at the Transmitter Side—The Advantage of

The advantage of transmitter-based implementation is that there is coherent superposition at one receiver at least. The reception at the second receiver portion (third in case of phantom inclusion) can be corrected by phase equalisation in the frequency domain. The implementation steps (for both transmitter and receiver implementation) are provided below with a numerical example. In this section, only the signal mathematical models are provided.

The channel frequency response for two lines (bonded dsl involves two pairs) is represented thus:

$$H = \begin{bmatrix} h_{11} & h_{12} \\ h_{21} & h_{22} \end{bmatrix},$$

the set of data and signals are given by:

$$D = \begin{bmatrix} d \\ d \end{bmatrix},$$

$$X = \begin{bmatrix} x \\ x \end{bmatrix},$$

and the noise free non-precoded signals set is:

$$Y = \begin{bmatrix} h_{11} & h_{12} \\ h_{21} & h_{22} \end{bmatrix} \begin{bmatrix} x \\ x \end{bmatrix},$$

In case of MRC, the transmitted signals are weighted by the transpose conjugate of H thus:

$$\check{X} = \begin{bmatrix} \frac{h_{11}^*}{|h_{11}|} & 0 \\ \frac{h_{12}^*}{|h_{12}|} & 0 \end{bmatrix} \begin{bmatrix} x \\ x \end{bmatrix} = \begin{bmatrix} \frac{xh_{11}^*}{|h_{11}|} \\ \frac{xh_{12}^*}{|h_{12}|} \end{bmatrix},$$

Under such pre-coding coefficients, the signals will be perfectly aligned at receiver 1 while receiver 2 requires phase correction, see below:

$$Y = \begin{bmatrix} h_{11} & h_{12} \\ h_{21} & h_{22} \end{bmatrix} \begin{bmatrix} \frac{xh_{11}^*}{|h_{11}|} \\ \frac{xh_{12}^*}{|h_{12}|} \end{bmatrix} = \begin{bmatrix} x(|h_{11}| + |h_{12}|) \\ x\left(\frac{h_{21}h_{11}^*}{|h_{11}|} + \frac{h_{22}h_{12}^*}{|h_{12}|}\right) \end{bmatrix}, \text{ where } h^*h = |h|^2$$

in this case the first set is coherent whilst the second is not $y_1 = x(|h_{11}| + |h_{12}|)$, $\hat{x}_1 = y_1(|h_{11}| + |h_{12}|)^{-1}$, Hence specific detection coefficients must be used in the receiver $$y_2 = x\left(\frac{h_{21}h_{11}^*}{|h_{11}|} + \frac{h_{22}h_{12}^*}{|h_{12}|}\right) = x\check{H}$$

$\hat{x}_2 = y_2 \check{H}^{-1}$,

Numerical Example

For a given channel:

$$H = \begin{bmatrix} -0.0021 + 0.0003i & -0.0015 - 0.0002i \\ 0.0008 - 0.0006i & 0.0005 + 0.00032i \end{bmatrix},$$

Data $$D = \begin{bmatrix} 3 \\ 3 \end{bmatrix},$$

Symbols $$X = \begin{bmatrix} 1-i \\ 1-i \end{bmatrix},$$

MRC, Channel and Received symbols $$\check{X} = \begin{bmatrix} -0.9899 - 0.1414i & 0 \\ -0.9912 + 0.1321i & 0 \end{bmatrix} \begin{bmatrix} 1-i \\ 1-i \end{bmatrix} = \begin{bmatrix} -1.1314 + 0.845i \\ -0.8591 + 1.1234i \end{bmatrix},$$

$$Y = \begin{bmatrix} -0.0021 + 0.0003i & -0.0015 - 0.0002i \\ 0.0008 - 0.0006i & 0.0005 + 0.00032i \end{bmatrix}$$

$$\begin{bmatrix} -1.1314 + 0.845i \\ -0.8591 + 1.1234i \end{bmatrix} = \begin{bmatrix} 0.0036 - 0.0036i \\ -0.0044 - 0.0008i \end{bmatrix},$$

After Equalisation $$\tilde{x}_1 = \frac{0.0036 - 0.0036i}{0.0036} = 1 - i,$$

$$\tilde{x}_2 = \frac{-0.0044 - 0.0008i}{-0.0018 - 0.0026i} = 1 - i,$$

After combining $$\tilde{x} = \rho_1 \cdot \tilde{x}_1 + \rho_2 \cdot \tilde{x}_2 = 1 - i$$

It will be apparent to the skilled reader after reading the above, that the above described embodiments permit a bonded pairs environment to be utilised efficiently even at high frequencies where attenuation and high levels of crosstalk become a problem even for short lines using vectoring. The solution can be implemented entirely on a tone by tone basis but it may be convenient to have a single cut-off tone beyond which (with increasing frequency) all remaining tones which can support data (in the related-signals mode of operation) are employed in the related signals mode of operation. Embodiments are particularly applicable to G.Fast type installations which envisage using very high frequency tones in providing very high bandwidth connections over relatively short distances of twisted copper pairs. In such a situation it is straightforward for the accurate channel estimations to be performed because training procedures can be used without inconveniencing other users (there is only one user for both lines) and the bandwidth available to the user is sufficiently high that the small amount consumed in performing channel estimations is not likely to be of great significance. Similarly SNR estimations can readily be performed without greatly inconveniencing the user.

With accurate knowledge of the channels, by sending the same (or closely related) signals over both pairs in the bonded system, the system is able to transmit useful data even where high crosstalk coupling and high levels of external noise might prevent a vectored solution from being able to exploit those frequencies.

The invention claimed is:

1. A method of transmitting data between a transmitter and a receiver via two pairs of wires extending between the transmitter and the receiver, the transmitter including first and second transmitter portions and the receiver including first and second receiver portions for receiving signals transmitted by the transmitter in a differential mode, the method comprising:
   transmitting, from the transmitter to the receiver, using a discrete multi-tone protocol using up to a number of different tones, a data signal in which related signals are transmitted onto the two pairs of wires in the differential mode, and each of the first and second receiver portions receives the signals, converts them into a frequency domain and then processes resulting signals using frequency domain equalisation coefficients calculated in dependence upon estimated channel transfer functions associated with direct differential mode channels between a corresponding transmitter portion and each respective receiver portion and additionally in dependence upon estimated channel transfer functions associated with indirect differential mode channels between the other transmitter portion and each receiver portion; wherein
   after processing the resulting signals using the frequency domain equalisation coefficients, the resulting signals are combined to form a combined recovered signal which is further processed to obtain the transmitted data; and wherein
   the related signals are transmitted onto the two pairs of wires in the differential mode in respect of only a first subset of the tones usable by the transmitter and the receiver and wherein unrelated signals are transmitted onto the two pairs of wires for each tone in a second subset of the tones usable by the transmitter and the receiver, wherein the unrelated signals are vector precoded before being transmitted onto the two pairs of wires and wherein a cut-off frequency and/or tone demarcates between the first and second subsets such that the tones in the first subset are associated with frequencies above the cut-off frequency and/or tone and the tones in the second subset are associated with frequencies up to and/or below the cutoff frequency and/or tone.

2. The method according to claim 1 wherein the further processing to obtain the transmitted data comprises performing demodulation.

3. The method according to claim 2 wherein the demodulation is Quadrature Amplitude Modulation (QAM) demodulation.

4. A system for transmitting data between an upstream transceiver and a downstream transceiver via two pairs of wires extending between the transceivers, the system comprising:
   the upstream transceiver which includes first and second transmitter portions;
   the downstream transceiver which includes first and second receiver portions for receiving signals transmitted by the upstream transceiver in a differential mode; and
   the two pairs of wires extending between the transceivers, the two pairs of wires forming a composite channel through which the signals transmitted by the upstream transceiver travel before being received by the downstream transceiver, the composite channel including direct differential mode channels between the first and second transmitter portions on the one hand and the first and second receiver portions respectively on the other hand, and indirect differential mode channels between the first and second transmitter portions on the one hand and the second and first receiver portions respectively on the other hand; wherein the upstream transceiver is configured to transmit, to the downstream transceiver, using a discrete multi-tone protocol using up to a number of different tones, a data signal in which related signals are transmitted onto the two pairs of wires in the differential mode, such that, in use, each of the first and second receiver portions receives a respective one of the transmitted signals after modification by the composite channel together with some portion of an other related signal; and wherein each receiver portion includes a fast Fourier Transformer configured to convert the received signal into a frequency domain and a related-signals processing frequency domain equaliser configured to process a resulting signal using frequency domain equalisation coefficients calculated in dependence upon estimated channel transfer functions associated with a direct differential mode channel terminating at the respective receiver portion and additionally in dependence upon estimated channel transfer functions associated with an indirect differential mode channel terminating at the respective receiver portion; wherein the downstream transceiver further includes a signal combiner configured to combine, on a tone-by-tone and symbol-by-symbol basis, signals output by the related-signals processing frequency domain equalisers of the first and second receiver portions; and wherein the related signals are transmitted onto the two pairs of wires in the differential mode in respect of only a first subset of the tones usable by the transceivers and wherein unrelated signals are transmitted onto the two pairs of wires for each tone in a second subset of the tones usable by the transceivers, wherein the unrelated signals are vector precoded before being transmitted onto the two pairs of wires and wherein a cut-off frequency and/or tone demarcates between the first and second subsets such that the tones in the first subset are associated with frequencies above the cut-off frequency and/or tone and such that the tones in the second subset are associated with frequencies up to and/or below the cutoff frequency and/or tone.

5. The system according to claim 4 wherein the downstream transceiver further includes a switch mechanism configured to switch output signals from the fast Fourier Transformer to either the related-signals processing frequency domain equaliser or else to a single signal frequency-domain equaliser.

6. The system according to claim 5 wherein the switch mechanism is configured to switch the output signals from the fast Fourier Transformer to one or other of the frequency domain equalisers on the tone by tone basis such that the tones in the first subset are switched to the related-signals processing frequency domain equaliser and the tones in the second subset are switched to the single signal frequency-domain equaliser.

7. The system of claim 4 wherein the downstream transceiver further includes a quadrature amplitude modulation demodulator which processes, on the tone by tone and symbol by symbol basis, a combined signal generated by the signal combiner.

8. The system according to claim 4, wherein the upstream transceiver further includes a maximum ratio combiner precoder configured to precode and phase rotate first and second signals such that a directly received signal to a predetermined one of the receiver portions in the downstream transceiver arrives at the predetermined receiver portion aligned in phase with at least one indirectly received signal arriving at the predetermined receiver portion.

* * * * *